(12) United States Patent
Strauser

(10) Patent No.: US 9,685,803 B2
(45) Date of Patent: Jun. 20, 2017

(54) ADAPTABLE CONSUMER ELECTRONIC DEVICE CRADLE

(71) Applicant: DOK SOLUTION LLC, Largo, FL (US)

(72) Inventor: Jack Strauser, Largo, FL (US)

(73) Assignee: DOK SOLUTION LLC, Largo, FL (US)

(*) Notice: Subject to any disclaimer, the term of this patent is extended or adjusted under 35 U.S.C. 154(b) by 0 days.

(21) Appl. No.: 15/217,066

(22) Filed: Jul. 22, 2016

(65) Prior Publication Data

US 2016/0329728 A1    Nov. 10, 2016

Related U.S. Application Data (63) Continuation-in-part of application No. 14/463,683, filed on Aug. 20, 2014, now Pat. No. 9,423,844, which is a continuation-in-part of application No. 14/134,227, filed on Dec. 19, 2013, now Pat. No. 9,425,651, which is a continuation-in-part of application No. 13/345,994, filed on Jan. 9, 2012, now Pat. No. 8,675,356, which is a continuation-in-part of application No. 13/373,076, filed on Nov. 3, 2011, now Pat. No. 8,593,802, which is a continuation-in-part of application No. 12/699,078, filed on Feb. 3, 2010, now Pat. No. 8,116,077, which is a continuation-in-part of application No. 11/676,850, filed on Feb. 20, 2007, now Pat. No. 7,742,293.

(51) Int. Cl.
*H02J 7/00* (2006.01)
*G06F 1/16* (2006.01)
*G06F 1/18* (2006.01)
*G06F 1/26* (2006.01)

(52) U.S. Cl.
CPC .......... *H02J 7/0044* (2013.01); *G06F 1/1632* (2013.01); *G06F 1/18* (2013.01); *G06F 1/266* (2013.01); *H02J 7/0027* (2013.01); *H02J 7/0052* (2013.01); *H02J 2007/0062* (2013.01)

(58) Field of Classification Search
None
See application file for complete search history.

(56) References Cited

U.S. PATENT DOCUMENTS

6,524,240 B1 * 2/2003 Thede .................... A61B 5/021
128/897
D513,938 S    1/2006 Griffin
(Continued)

*Primary Examiner* — Xanthia C Cunningham
(74) *Attorney, Agent, or Firm* — Larson & Larson, P.A.; Frank Liebenow; Patrick Reid (57) ABSTRACT

A consumer electronic device cradle for holding and providing power to any number of consumer electronic devices has a cavity that is large enough to contain a largest anticipated consumer electronic device. The cavity has there within one or more steps and each step defines a sub cavity within the cavity. Each sub cavity within the cavity supports another smaller sized consumer electronic device. A trough is cut or formed in a side surface of the cavity for routing a cable to the consumer electronic device resting in the cavity. In some embodiments, a support wall extends from a surface of the cradle for supporting the consumer electronic device and the trough is also cut or formed through the support wall.

17 Claims, 9 Drawing Sheets

(56) References Cited

U.S. PATENT DOCUMENTS

| | | | |
|---|---|---|---|
| 7,399,198 B2 * | 7/2008 | Thalheimer | H04R 5/02 439/501 |
| D579,443 S | 10/2008 | Donovan et al. | |
| D589,930 S * | 4/2009 | McGeeney | D14/172 |
| D595,722 S | 7/2009 | Miyawaki | |
| D600,251 S * | 9/2009 | Poandl | D14/168 |
| 7,719,830 B2 | 5/2010 | Howarth et al. | |
| 7,722,388 B1 * | 5/2010 | Michaeli | H04M 1/06 224/197 |
| 7,840,740 B2 | 11/2010 | Minoo | |
| 7,853,745 B2 | 12/2010 | Muraki | |
| 8,054,042 B2 | 11/2011 | Griffin et al. | |
| 8,115,451 B2 | 2/2012 | Griffin et al. | |
| 8,137,129 B2 * | 3/2012 | Woods | B60R 16/0215 439/501 |
| 8,183,825 B2 * | 5/2012 | Sa | H02J 7/0044 320/107 |
| 8,195,114 B2 | 6/2012 | Krampf et al. | |
| 8,311,256 B1 | 11/2012 | Strauser | |
| 8,320,597 B2 | 11/2012 | Griffin et al. | |
| 8,366,480 B2 | 2/2013 | Neu et al. | |
| 8,477,953 B2 | 7/2013 | Hobson et al. | |
| 8,593,802 B1 * | 11/2013 | Strauser | G06F 1/1632 361/679.3 |
| 8,664,917 B2 * | 3/2014 | Jenkins | H02J 7/0044 310/50 |
| 9,130,375 B2 * | 9/2015 | Yeh | H02J 7/0044 |
| 9,425,651 B2 * | 8/2016 | Strauser | G06F 1/1632 |
| 9,601,934 B2 * | 3/2017 | Ikegami | H02J 7/0044 |
| 2004/0150944 A1 | 8/2004 | Byrne et al. | |
| 2006/0013411 A1 | 1/2006 | Lin | |
| 2006/0116009 A1 | 6/2006 | Langberg et al. | |
| 2006/0127034 A1 | 6/2006 | Brooking et al. | |
| 2006/0181840 A1 | 8/2006 | Cvetko | |
| 2006/0221776 A1 | 10/2006 | Roman et al. | |
| 2006/0250764 A1 | 11/2006 | Howarth et al. | |
| 2007/0015418 A1 * | 1/2007 | Faranda | G06F 1/1632 439/680 |
| 2007/0058332 A1 | 3/2007 | Canterbury et al. | |
| 2007/0291475 A1 | 12/2007 | Heathcock | |
| 2008/0278894 A1 * | 11/2008 | Chen | G06F 1/1632 361/679.01 |
| 2008/0304688 A1 * | 12/2008 | Kumar | G06F 1/1616 381/370 |
| 2008/0307144 A1 | 12/2008 | Minoo | |
| 2009/0009957 A1 | 1/2009 | Crooijmans et al. | |
| 2009/0129010 A1 | 5/2009 | Park et al. | |
| 2009/0278495 A1 * | 11/2009 | Kaye | H02J 7/0027 320/114 |
| 2009/0295328 A1 * | 12/2009 | Griffin, Jr. | H02J 7/0027 320/115 |
| 2010/0067197 A1 * | 3/2010 | Guccione | G06F 1/26 361/728 |
| 2010/0195279 A1 | 8/2010 | Hennessy | |
| 2011/0134601 A1 * | 6/2011 | Sa | G06F 1/1632 361/679.43 |
| 2011/0216495 A1 * | 9/2011 | Marx | H05K 5/02 361/679.22 |
| 2012/0106069 A1 * | 5/2012 | Strauser | G06F 1/1632 361/679.41 |
| 2015/0288215 A1 * | 10/2015 | Zhang | G06F 1/3234 713/323 |
| 2016/0149427 A1 * | 5/2016 | Dittrich | H04M 1/04 320/115 |
| 2016/0218535 A1 * | 7/2016 | Prete | H02J 7/0044 |

* cited by examiner

ADAPTABLE CONSUMER ELECTRONIC DEVICE CRADLE

CROSS-REFERENCE TO RELATED APPLICATION

This application is a continuation-in-part of U.S. patent application Ser. No. 14/463,683, filed Aug. 20, 2014 which in turn is a continuation-in-part of Ser. No. 14/134,227, filed Dec. 19, 2013; which in turn is a continuation-in-part of U.S. Pat. No. 8,675,356 issued on Mar. 18, 2013; which in turn is a continuation-in-part of U.S. Pat. No. 8,593,802 issued on Nov. 6, 2013; which in turn is a continuation-in-part of U.S. Pat. No. 8,116,077 issued on Feb. 14, 2012, which in turn is a Continuation-in-Part of U.S. Pat. No. 7,742,293 issued on Jun. 22, 2010, the disclosures of the above are hereby incorporated by reference. This application is related to U.S. Pat. No. 8,593,804 issued on Nov. 26, 2013, which is also incorporated by reference.

FIELD

This invention relates to the field of consumer electronic devices and more particularly to a system for supporting multiple consumer electronic devices while the consumer electronic devices are, for example, in use and/or charging.

BACKGROUND

Many consumer electronic devices are powered by an internal rechargeable battery and, to recharge the battery, the consumer electronic devices are connected to an external source of electrical power while an internal circuit controls charging of the internal rechargeable battery.

One recharging system includes what is often referred to as a "wall wart." A "wall wart" is typically a sealed transformer and/or power conditioning circuit connected to a typical A/C plug (approximately 117 VAC in the USA). Conditioned power from the wall wart is transferred to the consumer electronic device through a cable and a cable connector. The connector mates with a corresponding connector on the consumer electronic device. For example, many new smart phones have miniature USB connectors. These miniature USB connectors mate with male miniature USB connectors at an end of a power cable, in turn connected to a wall wart that provides conditioned 5 VDC power. This method of charging functions but causes clutter; particularly when users have multiple devices. Additionally, each wall wart that remains plugged into A/C power drains a small amount of A/C power even when not charging the consumer electronic devices. Users often disconnect their device after charging but fail to unplug their wall wart from the A/C power outlet. This results in a waste of energy.

There is currently a standardize approach to charging from a voltage (e.g. 5 VDC) and current as provided with the Universal Serial Bus standard. This standard would apply whether power was provided through a miniature USB connector or through a proprietary connector, as is at times found on some cellular phones. Suppliers of consumer electronic devices often provide a cable having a standard USB connector at one end for connecting to a 5 VDC source (e.g. wall wart or computer port), and a mating connector for connecting to the consumer electronic device at the other end. The user is able to obtain power for the standard USB connector at many sources, such as: wall warts that have a female standard USB connector, computer systems with USB ports, airport charging stations, female USB connectors in vehicles, etc. Still, many use the wall wart that is usually included with their device, leaving the wall wart plugged into A/C power for longer than needed.

There are cradles for holding consumer electronic devices and, optionally, use while charging. Some of the cradles use the wall wart provided with the consumer electronic devices. Others have their own power source. There are times when a user wishes to use the device while charging. For example, one may wish to watch a movie or make a call on some consumer electronic devices while the consumer electronic device is in a cradle.

Some such cradles include integrated connectors for directly connecting to the consumer electronic devices, making such cradles dedicated to one or a small family of consumer electronic devices. Other cradles provide a cable for connection to the consumer electronic devices, but routing of the cable is not convenient.

There are chargers that have multiple USB female connectors for concurrently charging multiple consumer electronic devices through cables. In such, the devices are not typically held or supported in any particular position on such charges and the devices being charged must rest on surfaces such as countertops.

Recently, several manufacturers have created home entertainment systems that have one or more charging stations that connect to the consumer electronic devices; some having cradles to support the consumer electronic devices. Home entertainment systems already use some "parasitic" power to maintain clocks (time of day) and maintain a standby state waiting for a command from a remote control. Therefore, since such devices already use a small amount of "parasitic" power, there is little or no additional power used to make those devices ready to power/charge the consumer electronic devices.

Such entertainment systems sometimes include a docking port for one particular consumer electronic device such as a docking port for one particular manufacturer's consumer electronic device. In some entertainment systems, a consumer electronic device rests in and plugs into a fixed connector. In such, if the manufacturer of such devices releases newer products with a different connector type or connector position, the entertainment system is no longer useful for the new devices and a different entertainment system is needed for the new devices. This recently occurred with a major phone manufacturer which changed the connector type on all new phones and, those who had entertainment systems that supported and charged the old style phone found these entertainment systems to be obsolete after upgrading to the new phone.

In modern times, many individuals and families own multiple devices that need charging several times per week. For example, on any given day, a single person owning a smart phone, digital music player, and a tablet PC will find a need to charge one or more of these consumer electronic devices. There are charging stations that accept multiple devices, having cradles for smaller devices such as smart phones, yet requiring larger consumer electronic devices (e.g. tablet PCs) to rest on a horizontal surface. There are many drawbacks to resting consumer electronic devices horizontally including, but not limited to, increasing the risk of damage from setting heavy objects on the larger consumer electronic device's display, splatter from nearby sources of liquids (e.g., sinks), increased dust adhesion, fluid penetration from a nearby spill, etc.

Some recent consumer products include charging ports and locations for holding one or more consumer electronic devices. There are many amplified speaker systems or clock radio systems that include a cradle with or without an integrated connector for one particular consumer electronic device. These consumer electronic devices generally support exactly one consumer electronic device.

There are several problems with prior consumer electronic systems that support one or more consumer electronic devices. Many or all such consumer electronic systems support consumer electronic i-devices (e.g. those made by a particular manufacturer that names their products starting with an "i") from only a single manufacturer. Many or all such consumer electronic systems support only a small, very limited size range of consumer electronic devices, typically only one or a small subset of all possible consumer electronic devices such as only one i-device. Many or all such consumer electronic systems do not support larger consumer electronic devices such as tablet computers. Many or all such consumer electronic systems do not concurrently support smaller consumer electronic devices concurrently while supporting larger consumer electronic devices such as tablet computers. Many or all such consumer electronic systems do not provide proper physical support for larger consumer electronic devices such as tablet computers. Many or all such devices do not allow viewing of each device's display while docked and charging.

What is needed is a system that will support and provide charging connection to a mix of consumer electronic devices in a proper orientation while providing support to these devices.

SUMMARY

A consumer electronic system for holding and providing power to any number of consumer electronic devices has a cradle into which one of the devices is inserted. When a consumer electronic device is within the cradle and connected to a power port for charging or use, the consumer electronic device rests or sits properly within an opening of a cavity or sub opening of the cavity of the cradle. The device cable passes through this gap or trough so that the device cable doesn't perturb the consumer electronic devices (e.g., allowing for a stable containment of the consumer electronic devices at a proper viewing angle).

In one embodiment, a consumer electronic device cradle for supporting any one of a plurality of consumer electronic devices of differing sizes is disclosed. The consumer electronic device cradle includes a base having a cavity. The cavity has a first dimension that accepts an end portion of a largest consumer electronic device of the plurality of consumer electronic devices. There is trough in a back side of the base. The trough permits routing of a cable (e.g. power cable) connected to the one of the plurality consumer electronic devices. The cavity includes at least one step. Each step defines a smaller dimensioned sub cavity than the dimension of the cavity and each smaller dimension sub opening is sized to hold a different one of the plurality of consumer electronic devices.

In another embodiment, a method of supporting one of a plurality of consumer electronic devices is disclosed. Each of the consumer electronic devices has a different size. The method includes connecting a first consumer electronic device (the largest consumer electronic device of the plurality of consumer electronic devices) to a first end of the cable. A second end of the cable is connected to a source of power. A first end of the first consumer electronic device is inserted into a cavity in the base of the cradle that is sized to accept an end portion of the first consumer electronic device. The cavity has at least one step. Each of the at least one step forms a decreasing sized sub cavity towards a bottom of the cavity. The first consumer electronic device rests on a first step of the at least one step. The cable is routed through a trough in a side of the cavity. Now, the first consumer electronic device is removed from the cavity and a second consumer electronic device that is smaller than the first consumer electronic device is connected to the first end of the cable. A first end of the second consumer electronic device is inserted into the cavity and rests within the first sub cavity that is formed by the first step of the at least one step.

In another embodiment, a consumer electronic device cradle is disclosed. The cradle is for supporting any one of a plurality of consumer electronic devices of differing sizes. The consumer electronic device cradle includes a base having a cavity. The cavity accepts an end portion of a consumer electronic device of the plurality of consumer electronic devices. There is a feature for routing a data cable that is connected to the end portion of the consumer electronic devices (e.g., a trough in a side of the cavity) and features for supporting any one the plurality of consumer electronic devices within the base that includes at least one step, such steps form sub cavities of decreasing size towards a bottom of the cavity. Each sub cavity is of a size to hold a different one of the plurality of consumer electronic devices.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Throughout this description, the term, "consumer electronic device" refers to any handheld electronic devices such as digital music players (i-devices, MP3 players, etc.), digital media players (e.g., MP4 players, movie players), cellular phones (e.g., smart phones, i-phones), portable Global Positioning Satellite (GPS) devices, tablet computing devices (e.g. i-tablet computers), exercise tracking devices, etc. Any portable consumer electronic device is anticipated, whether or not the consumer electronic device has an internal rechargeable power source. Some consumer electronic devices have persistent storage for storing audio content (music) or video content (movies) such as a micro-hard disk or flash memory. Under user control, these files are retrieved, uncompressed and converted to audio and/or video. The analog audio signal is often emitted in a 3.5 mm or 2.5 mm stereo headphone jack for the user to connect headphones or other reproduction devices. Some devices have a specialized data/power connector for connecting to a source of power and/or transferring data (e.g. music) to/from the consumer electronic device. Many consumer electronic devices have graphical displays.

Throughout this description, the term, "consumer electronic system" refers to systems that supports/holds and optionally charges consumer electronic device. Consumer electronic systems optionally perform other functions such as amplifying audio and presenting the audio through speakers, as well as displaying the time, clock radio functions, etc.

Throughout this description, the term, "USB port" refers to an industry standard interface port, commonly known as "Universal Serial Bus." This particular port has become ubiquitous for many applications and uses, many of which do not utilize the integrated high-speed serial interface, and, instead, use only the standard power connection for powering of devices connected to the USB ports (e.g., digital music players, smart phones . . . ). Although the specific term, "USB" is used throughout this description and drawings, the invention and claims are not limited to any particular port or type of port, connector, nor is it limited to using such port for power only, power and communications, or communications only.

Figure 1:
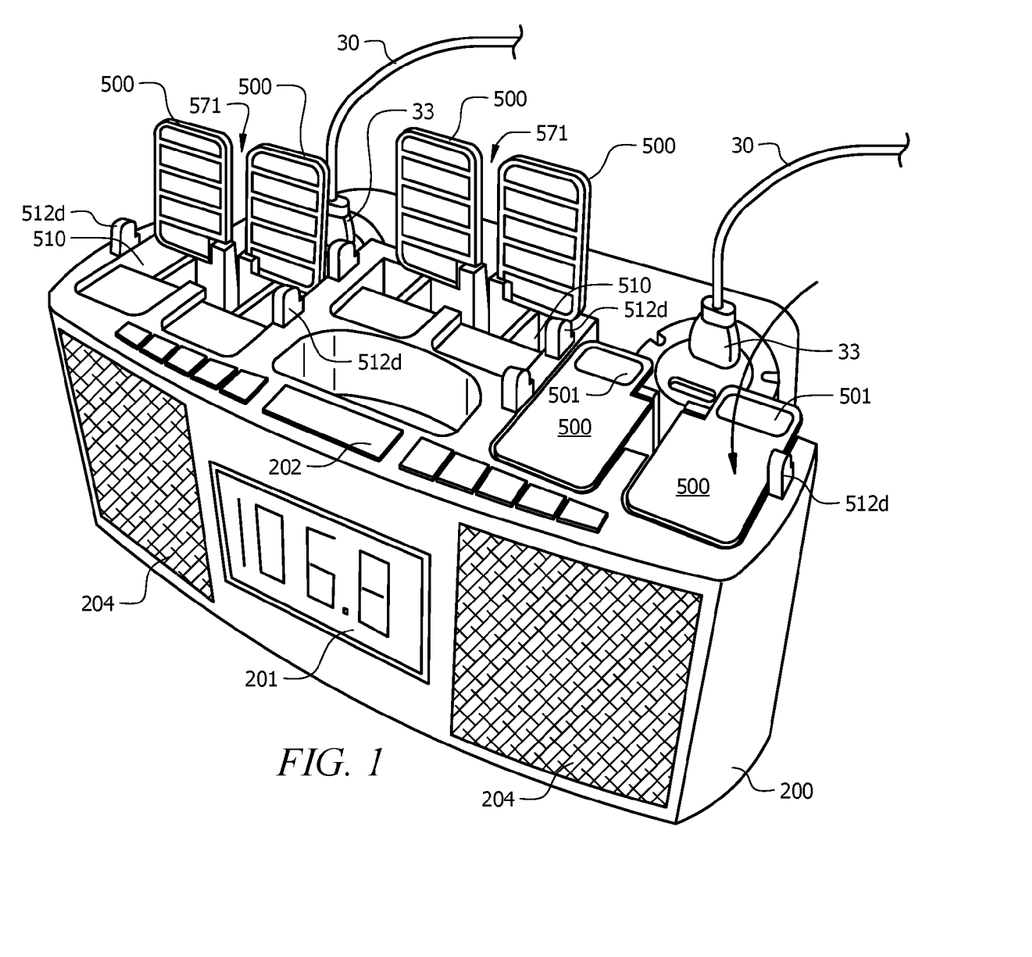
FIG. 1 illustrates a front perspective view of a consumer electronic system having multiple consumer electronic device cradles, showing the operation of the hinged support walls of the cradles.
Figure 2:
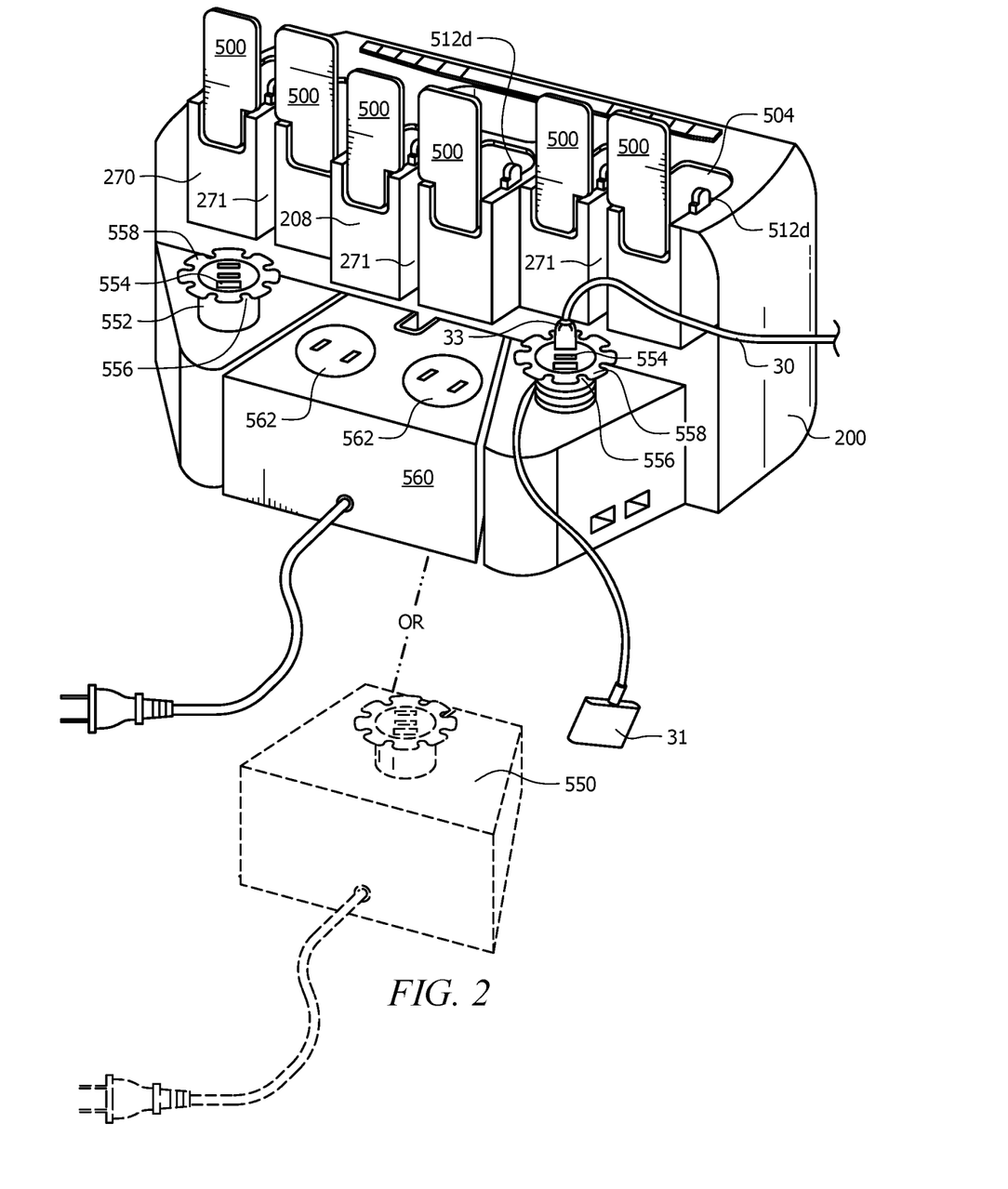
FIG. 2 illustrates a rear perspective view of the consumer electronic system having multiple consumer electronic device cradles.
Figure 3:
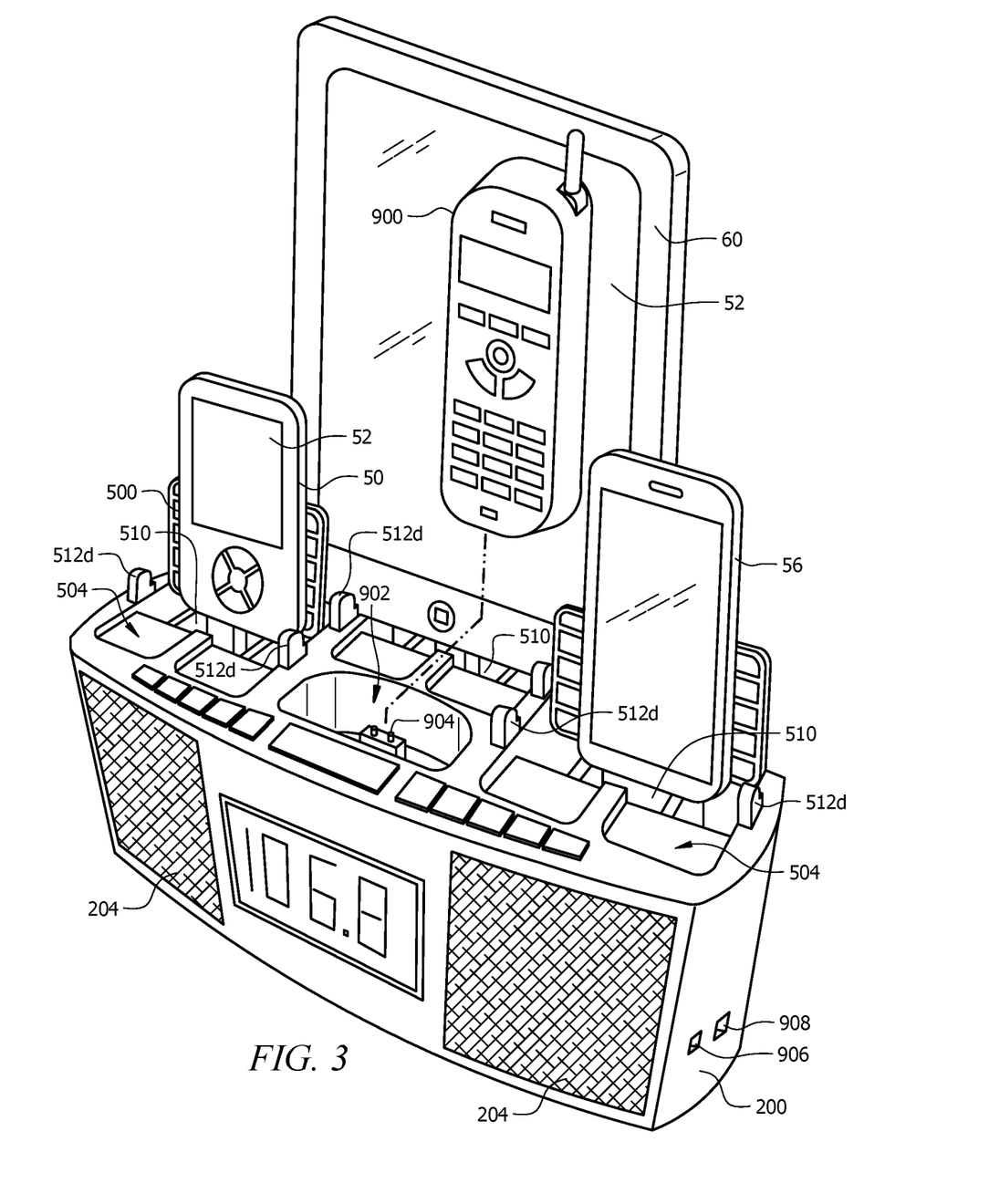
FIG. 3 illustrates a front perspective view of the consumer electronic system having multiple consumer electronic device cradles with consumer electronic devices held in the cradles.

Referring to FIGS. 1, 2, and 3, perspective views of a consumer electronic system 200 having multiple consumer electronic device cradles 208/270 is shown. In this example, the consumer electronic system 200 is shown having three cradles 208/270, although any number of cradles 208/270 is anticipated, including, but not limited to one cradle 270. Each cradle 208/270 has a set (pair) of support walls 500 for resting a consumer device 50/56/60 (see FIG. 2) against such. For smaller consumer devices 50, an end of the consumer device rests within the cavity 510. Each support wall 500 has a gap 271 for cable routing. Although not required, it is preferred that the gap 271 continue to the bottom of the cavity 510 such that, when consumer devices that have bottom edge connectors rest in the cavity 510, the cable 30 is easily routed out through the gap 271 without perturbing the consumer device 50/56/60.

Figure 4:
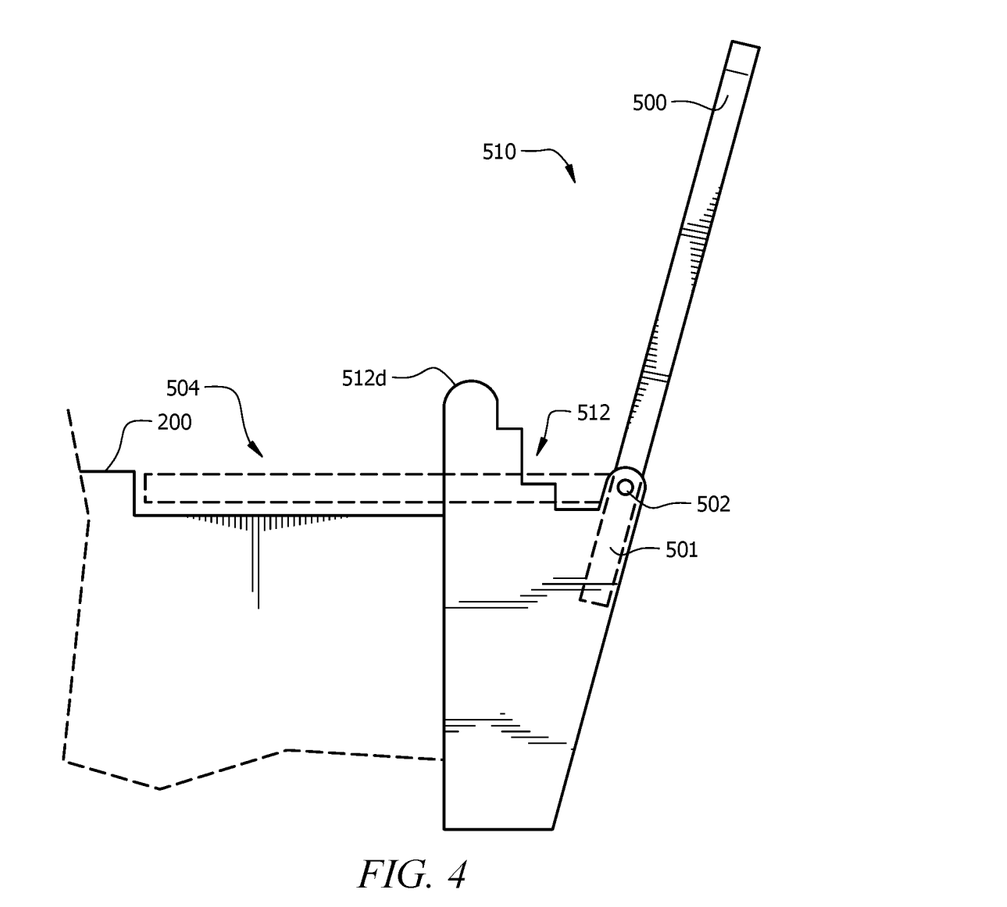
FIG. 4 illustrates a side view of the support walls operation of the cradles.

As shown in FIGS. 2-4, in some embodiments cutouts 504 are provided such that when the support walls 500 are in the closed position, the support walls 500 preferably lay flush within the cutouts 504 in the enclosure of the consumer electronic system 200. To facilitate ease in deploying the support walls 500, in a preferred embodiment, a tail end 501 of each support wall 500 is positioned on an opposing side of the pivot point 502 (see FIG. 4) to provide ease of deploying, in that, when the support walls 500 are in the closed position, pressing on the tail end 501 of the support walls 500, flip the support walls 500 into the deployed position, ready to support a consumer device 50/56/60.

In some embodiments, the cradles 208/270 are staggered with one cradle 208 positioned behind other cradles 270. In this way, a larger consumer electronic device 60 (e.g. a tablet computer 60) is accommodated within the cradle 208 (e.g. between the support wall 500 and the nubs 512d) without encroaching on the other cradles 270 as shown in FIG. 3.

In some embodiments, a cable manager is provided, preferably through a wire spool 552 with cap 558. In the example shown, the wire spool 552 has a cap 558 with one or more cable clips 556 (U-shaped indentations that hold a cable 30 that is pressed into the clips 556) around a periphery of the cap 558. In use a host-end (end towards the host connect 33) of the device cable 30 is wrapped around the wire spool 552 then fed through one of the cable clips 556 to maintain such wrapping. The USB connector 33 of the cable 30 is plugged into a USB port 554 that, in this example, is positioned on the cap 558. Note, in alternate embodiments, other locations for the USB ports 554 are anticipated, including locations on the consumer electronic system 200. Although each cap 558 is shown with three USB ports 554, any number of USB ports 554 is anticipated, including one USB port 554, as well is any type of connector, not limited to a USB port 554 or USB connector 554.

In some embodiments, nubs 512d are located on the base at the top-front of each cavity 510. The nubs 512d provide support to larger consumer electronic devices 60 that don't fit within the cavity 510.

Although not required, it is preferred that each cradle be staggered as shown. Such staggering provides visibility of each consumer electronic device's display 52 while, for example, charging. Note, that it is also anticipated that, other than charging, the consumer electronic systems 200 also includes data connections on the USB ports 554 and, in some embodiments, provide USB hub functionality (not shown) in support of data connection while the consumer electronic devices 50/56/60 are charging. In such, the interface connectors 554 include data connections as well as power connections.

Referring to FIG. 2, exchangeable center devices 550/560 are shown. In anticipation of different applications, some models of the consumer electronic system 200 require additional USB ports 554 and spools 556 as shown on the installed exchangeable center device 550, while in other models of the consumer electronic system 200, household power outlets 562 are needed as shown on the second exchangeable center device 560. These are examples of two anticipated options for center devices 550/560 and there is no limitation on the type, size, or location of such options. For example, some exchangeable center devices 550/560 provide wireless hub capability, lighting, extended base for music, etc.

In this example, the exchangeable center devices 550/560 have household power cables and plugs (as shown for US power outlets). In some embodiments, the circuit that converts household power to 5V DC is housed within the exchangeable center devices 550/560 and a DC connector bridges the 5V DC power to the consumer electronic system 200 while in some embodiments, household power is passed through connectors between the exchangeable center devices 550/560 and the consumer electronic system 200 and the circuit that converts household power to 5V DC is housed within the consumer electronic system 200. Note that 5V DC is used as a typical example and any voltage is anticipated as needed. Likewise, although a United States standard household power plug is shown, any power connection is anticipated to any power source in the world.

For completeness, the exemplary consumer electronic system 200 is a clock radio having a time display 201, speakers 204, and controls 202, though this is only an example and any type of consumer electronic system 200 is anticipated.

Referring to FIGS. 2 and 4, the support wall operation is shown. In FIG. 2, it is shown how the support walls 500 fold, swinging open for holding devices and swinging closed for aesthetics and reduced size during shipping. In FIG. 2, the support walls 500 are shown open (up) for the left two cradles 270 and are shown closed for the right cradle 270. As shown in FIG. 3, each of the consumer electronic devices 50/56/60 rest against the support walls 500, either resting one end of the consumer electronic devices 50/56/60 within the cavities 510 or wedging an end of, for example, the larger devices 60 between the folding support walls 500 and the nubs 512d.

For various reasons, including appearance, smaller shipping size, dust reduction, the support walls 500 close as shown by way of the right-most set of support walls 500 on the right-most cavity 270 of FIG. 1. Being that it is important to pass the device cables 30 through the slits 271 in the back of the cradles 208/270, the support walls 500 are made in two sections with a gap 571 between the sections allowing for passing of the device cables 30. In this way, the device cables 30, being connected to the consumer device 50/56/60 (e.g. during use or charging), are easily fed through this gap 571 between the support walls 500 and through the gap 271 in the cradle 208/270 when the consumer device 50/56/60 is placed in/on the cradle 208/270. By way of this configuration, a consumer device 50/56/60 will rest steadily on the cradles 208/270 and the device cable 30 will be properly dressed such that the device cable 30 does not perturb the consumer device 50/56/60, making the consumer device 50/56/60 unstable and/or resting at an angle which impairs display readability. The user doesn't have to feed a large connector and cable through a small hole as with some consumer systems nor insert the consumer device 50/56/60 into the cradle 208/270 with the cable 30 sticking out of the cradle 30, making the consumer device 50/56/60 unstable or crooked. Also, often people need to remove their cable 30, requiring the reverse action when, for example, leaving home for the office.

In some embodiments of the consumer electronic system 200, electronics and features support a phone 900, including a phone support cradle 902 for holding and supporting the phone 900 and, when the phone is a cordless phone, a cordless phone connector 904 for providing charging and/or voice connections to the cordless phone 900 when the cordless phone 900 is within the cordless phone support cradle. In embodiments when the phone 900 is not cordless, it is anticipated that a phone cable (not shown) connect the phone 900 to the consumer electronic system 200 and, preferably, the cord spools onto an internal spool within the consumer electronic system 200. In embodiments having a phone 900, a phone jack 906 is supplied for connection to the phone system (not shown) and internal electronics are supplied, as known in the cordless phone industry, for charging of and for wireless connection to the cordless phone 900.

In some embodiments, the consumer electronic system 200 further includes a wireless hub for wireless connections to various devices, for example, an 802.11 (Wi-Fi) wireless hub. In such embodiments, one or more antenna are present, either internal or external (not shown for brevity reasons) and a network jack 908 is included for connection to a network interface such as a cable modem, etc.

In FIG. 4, it is shown how the folding support walls 500 transition from an extended position (deployed) to a retracted position. When deployed, the support walls 500 support a consumer device 50/56/60 that rests within the cavity 510. When retracted (shown in dashed lines), the support walls 500 preferably lay flush as shown laying within a cutout 504 in the enclosure of the consumer electronic system 200.

In the example shown, the foldable support walls 500 are hingedly held to the consumer electronic device's 200 enclosure by pivots 502, for example, hinge pins, pivot pins, screws, nubs, etc. Any form of foldable construction is anticipated. To facilitate ease in deploying the support walls 500, in a preferred embodiment, a tail end 501 of each support wall 500 is positioned on an opposing side of the pivot point 502 (see FIG. 4) to provide ease of deploying, in that, when the support walls 500 are in the closed position, pressing on the tail end 501 of the support walls 500, flip the support walls 500 into the deployed position, ready to support a consumer device 50/56/60.

In a preferred embodiment, the cavities 510 are stepped (or staggered) with one or more steps 512 as described in the patents that are included by reference. These steps allow for successively smaller consumer devices 50/56/60 to fit within successively smaller openings formed by successive steps 512.

Figure 5:
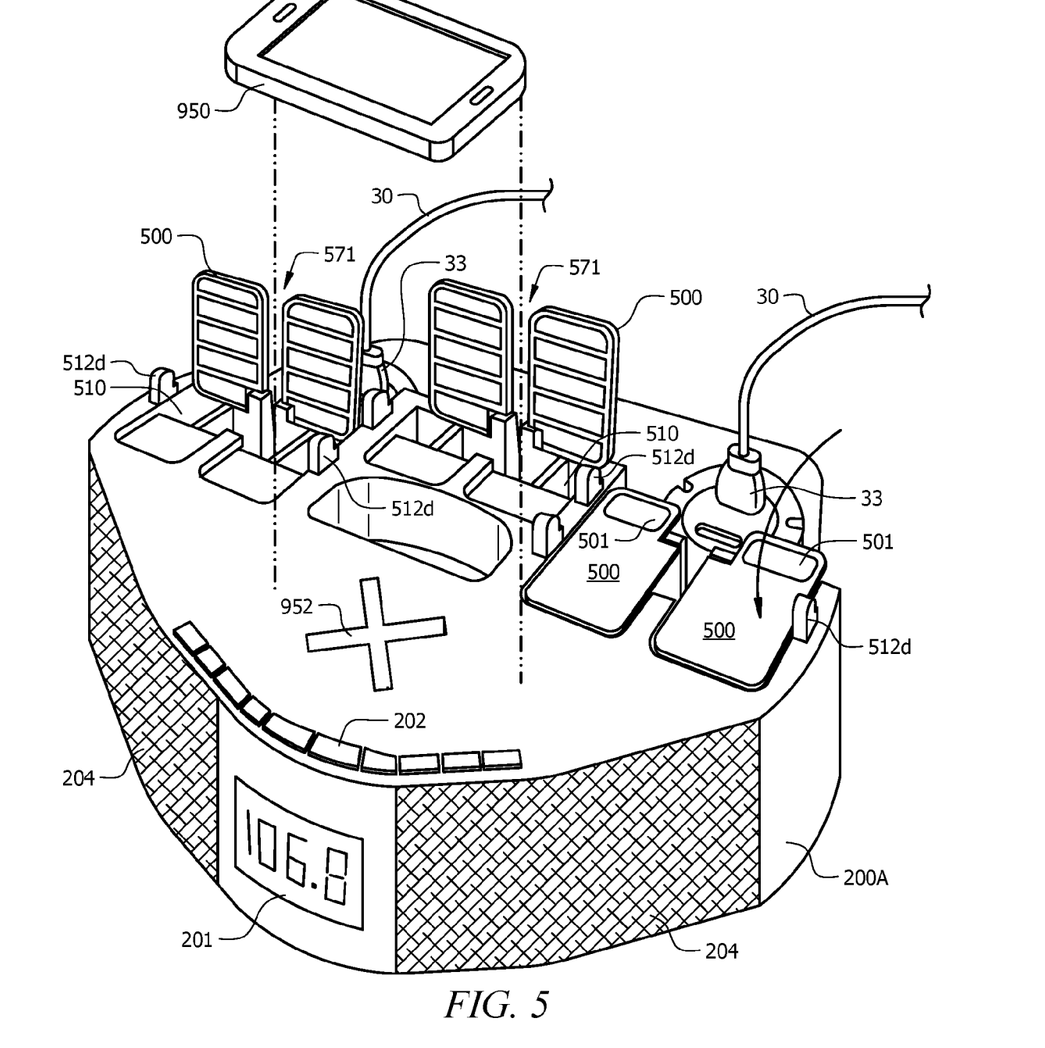
FIG. 5 illustrates a front perspective view of a consumer electronic system having multiple consumer electronic device cradles and having a wireless charging station.

Referring to FIG. 5, a front perspective view of a consumer electronic system 200A that has multiple consumer electronic device cradles and having a wireless charging station 952. Recently, charging mats have been made available that are capable of charging consumer devices 50/56/60 without the use of cables 30. The consumer devices 50/56/60 need be modified to permit such charging by adding a charge reception system (not shown) to the consumer devices 50/56/60, as known in the industry. In the example shown in FIG. 5, a consumer device 50/56/60, in particular a smartphone 950 is equipped with such charge reception circuitry and is shown being placed on a wireless charging station 952 that is located upon the consumer electronic system 200A. Note that the location of the wireless charging station 952 is shown as an example, and any location on the consumer electronic system 200A is anticipated, including within the cradles 510 and on a platform extending from the front, sides, or back surfaces of the consumer electronic system 200A.

Figure 6:
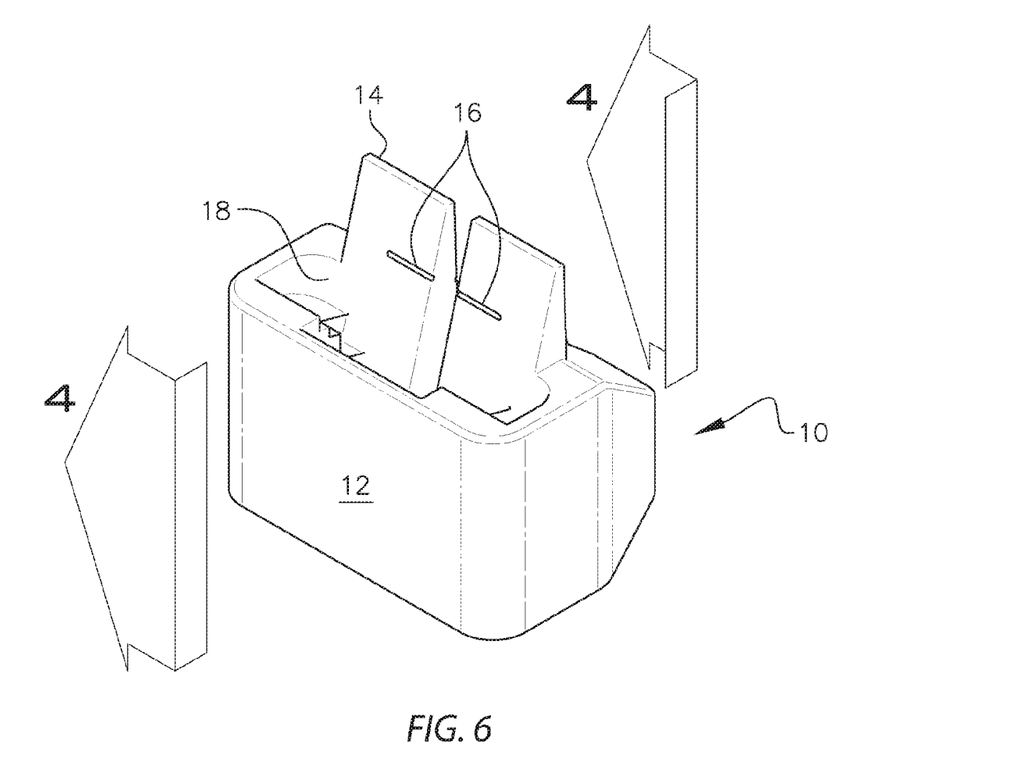
FIG. 6 illustrates an isometric view of a consumer electronic device cradle.

Referring to FIG. 6, an isometric view of a consumer electronic device cradle is shown. The consumer electronic device cradle 10 accommodates a variety of consumer electronic devices of various widths and thicknesses, thereby eliminating the need for multiple cradles or adapter inserts as provided in the past. The consumer electronic device cradle 10 has a base 12, a cavity for containing an end of the consumer electronic device (not shown) and an optional support wall 14 for supporting the consumer electronic device on a slight slant towards the rear. In some embodiments, a pair of front clip indentations 16 is provided to hold a clip-on micro-sized music player (not shown).

Figure 7:
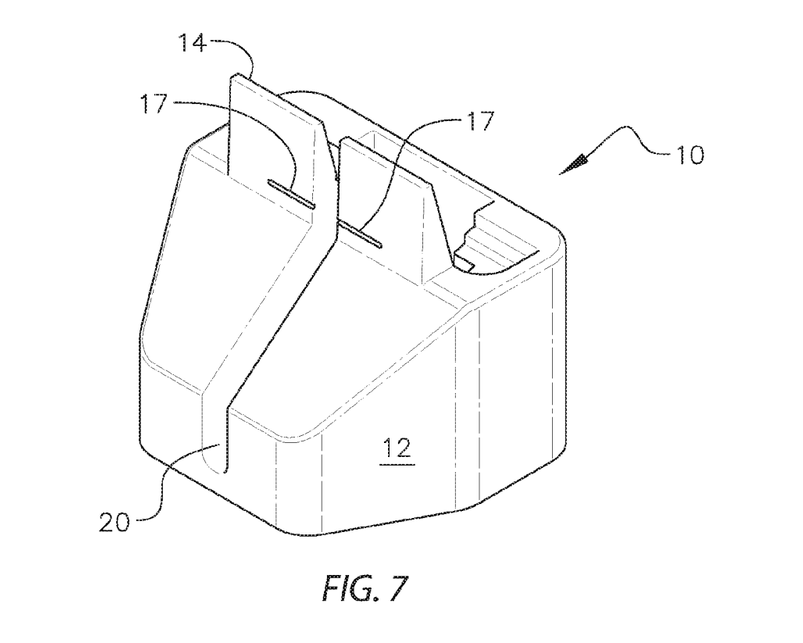
FIG. 7 illustrates an isometric view of a consumer electronic device cradle from the back.

Referring to FIG. 7, an isometric view of a consumer electronic device cradle is shown from the back. Again, the consumer electronic device cradle 10 accommodates a variety of consumer electronic devices of various widths and thicknesses. The consumer electronic device cradle 10 has a base 12, a cavity for containing an end of the consumer electronic device (not shown) and a support wall 14 for supporting the consumer electronic device on a slight slant towards the rear. In some embodiments, a pair of front clip indentations 16 is provided to hold a clip-on micro-sized music player (not shown). Also, in some embodiments, a pair of rear clip indentations 17 is provided to hold a clip-on micro-sized music player (not shown).

A cable trough 20 is provided to route a cable from the consumer electronic device (not shown). Often, the consumer electronic device (not shown) has a connector for connecting to a computer for transferring content through the cable. As an example, many current consumer electronic devices have a connector for connecting to a Universal Serial Bus (USB) cable.

Figure 8:
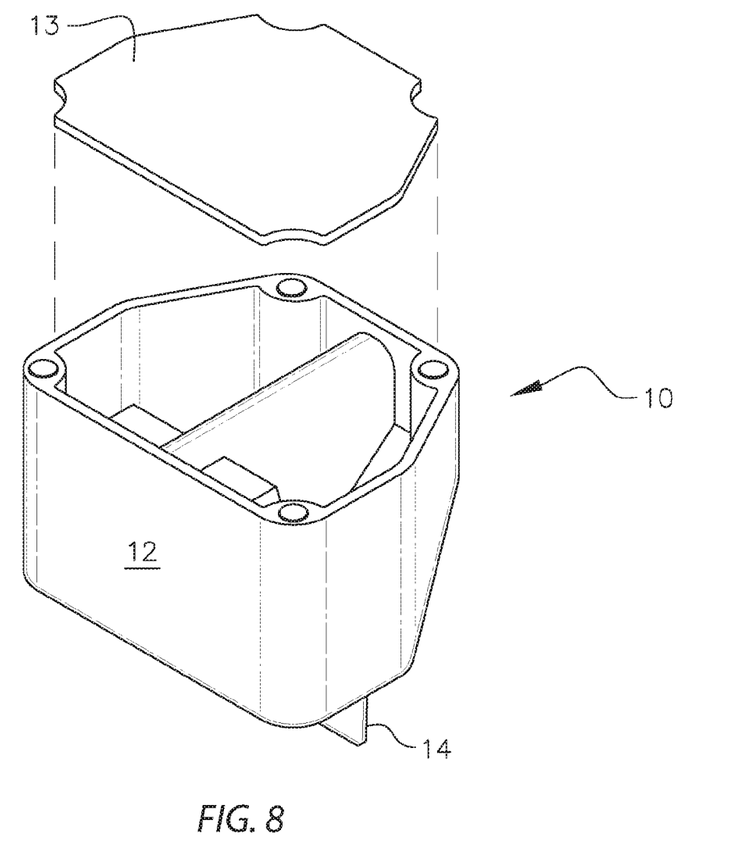
FIG. 8 illustrates an exploded view of a consumer electronic device cradle from the bottom.

Referring to FIG. 8, an exploded view of a consumer electronic device cradle is shown from the bottom. In some embodiments, the base of the consumer electronic device cradle 10 has a removable bottom 13. In some embodiments, balancing weights are disposed inside of the base 12 and sealed with the bottom 13 by various methods known in the art including, but not limited to, ultrasonic welding, adhesives, pressure fits, etc.

Figure 9:
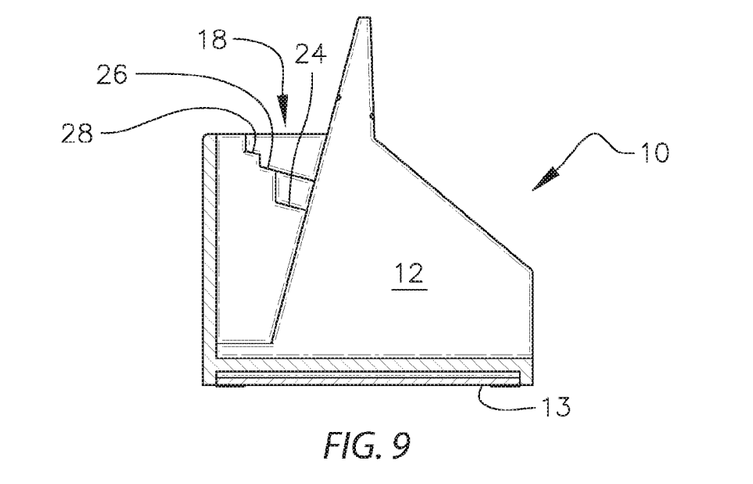
FIG. 9 illustrates a cross-sectional view of a consumer electronic device cradle along line 4-4 of FIG. 1.

Referring to FIG. 9, a cross-sectional view of a consumer electronic device cradle is shown along line 4-4 of FIG. 6. The base 12 consumer electronic device cradle is shown with the bottom 13 installed. In this embodiment, the cavity 18 is shaped to hold the ends of three different consumer electronic devices. An end of a larger-sized consumer electronic device such as an Apple Corporation 80 GB iPod® or a Microsoft Corporation Zume™ fits within the cavity 18, above a first step 28, resting on the first step 28. An end of a medium-sized consumer electronic device such as an Apple Corporation 30 GB iPod® fits within a first sub cavity formed by the first step 28, an end resting on a second step 26. An end of a smaller-sized consumer electronic device such as an Apple Corporation Nano® fits within a sub cavity formed by the second step 26, resting on the bottom 24 of the cavity 18. Although shown having two steps 26/28, the present invention is not limited in the number of steps 26/28 depending upon the various sizes of consumer electronic devices supported. Any number of consumer electronic devices is anticipated by the present invention. Although shown operating with certain consumer electronic devices, the consumer electronic device cradle 10 of the present invention is anticipated to be used with any size and shape of consumer electronic device such as cellular phones, tablet computers, music players, etc.

Figure 10:
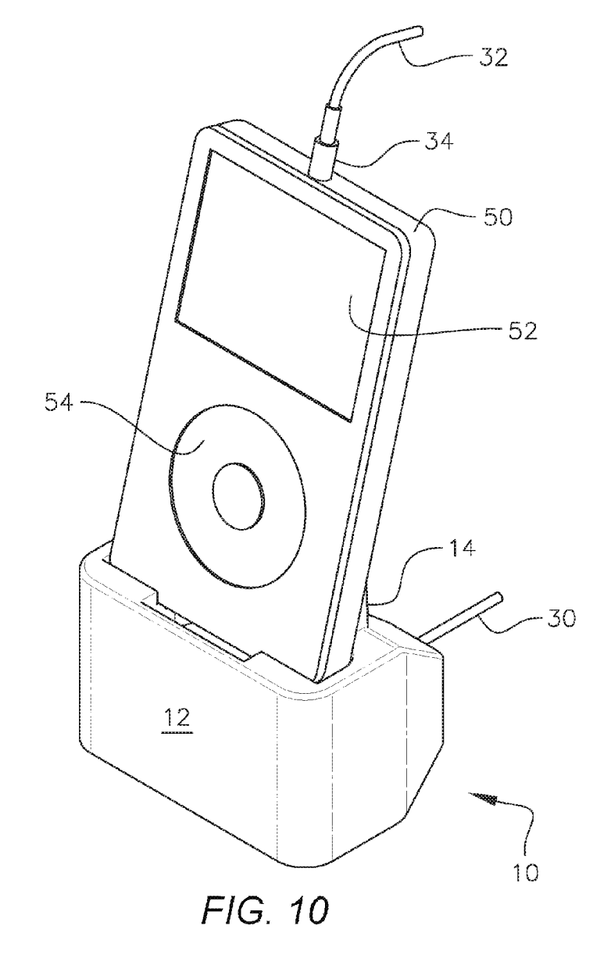
FIG. 10 illustrates an isometric view of a consumer electronic device cradle holding a large-sized consumer electronic device.

Referring to FIG. 10, an isometric view of a consumer electronic device cradle is shown holding a large-sized consumer electronic device 50. In this view, a large-sized consumer electronic device 50 such as the Apple Corporation 80 GB iPod® or a Microsoft Corporation Zume™ is shown resting within the outer cavity above the first step 28 and also resting against the optional support wall 14. In such a position, the large-sized consumer electronic device 50 is raised off the table surface, helping to prevent scratches and other damage. Many large-sized consumer electronic devices 50 have controls 54 for selecting songs, etc. and a display 52 for informing the user of various modes of operation, viewing contacts, images, etc. Also, many large-sized consumer electronic devices 50 have a connector into which a stereo headphone jack 34 with cable 32 is inserted. The cable 30 is connected to the large-sized consumer electronic device 50 by a connector similar to the connector 31 as shown in FIG. 7 (not visible in this figure) and the cable 30 is routed through the trough 20. The present invention functions with or without a cable 30 and connector 31 attached. Likewise, the present invention functions with or without an audio cable 32 attached.

Figure 11:
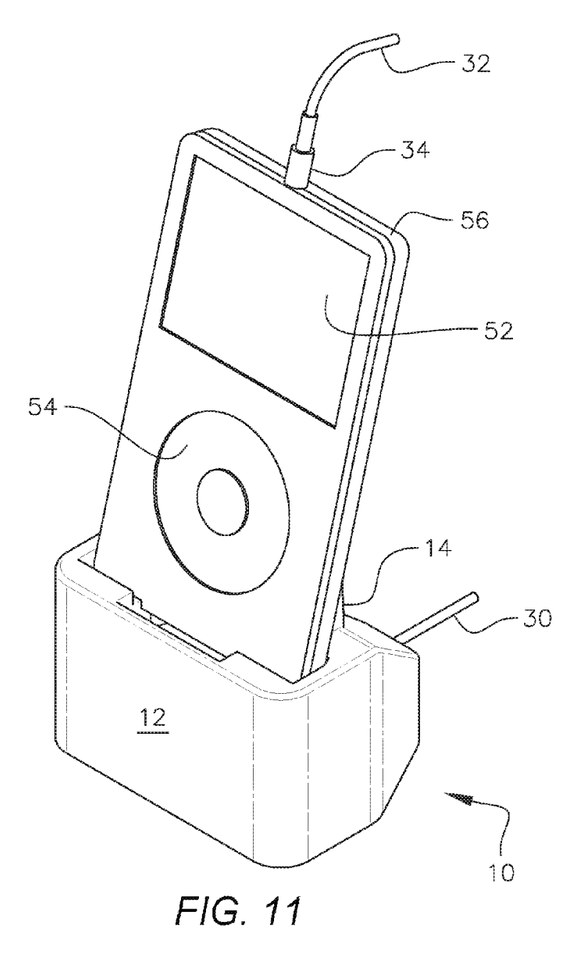
FIG. 11 illustrates an isometric view of a consumer electronic device cradle holding a medium-sized consumer electronic device.

Referring to FIG. 11, an isometric view of a consumer electronic device cradle is shown holding a medium-sized consumer electronic device. In this view, a medium-sized consumer electronic device 56 such as the Apple Corporation 30 GB iPod® is shown resting within the first sub cavity formed by the first step 28 and resting on the second step 26 an optionally resting against the support wall 14. In such a position, the medium-sized consumer electronic device 56 is raised off the table surface, helping to prevent scratches and other damage. Many medium-sized consumer electronic devices 56 have controls 54 for selecting songs, etc. and a display for informing the user of various modes of operation 52. Also, many medium-sized consumer electronic devices 56 have a connector into which a stereo headphone jack 34 with cable 32 is inserted. The cable 30 is connected to the medium-sized consumer electronic device 56 by a connector similar to the connector 31 as shown in FIG. 12 (not visible in this figure) and the cable 30 is routed through the trough 20.

Figure 12:
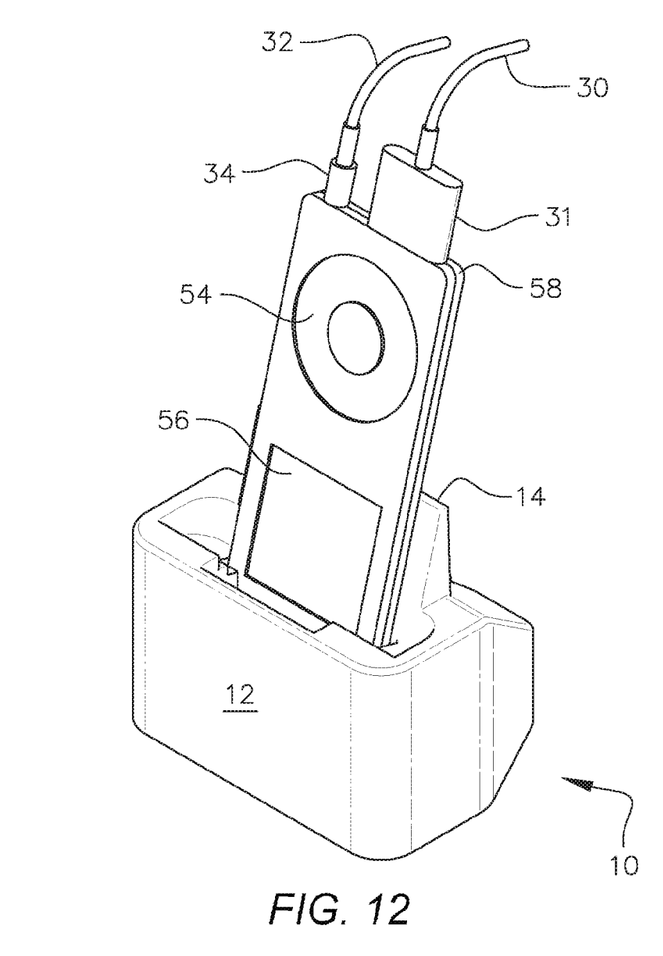
FIG. 12 illustrates an isometric view of a consumer electronic device cradle holding a small-sized consumer electronic device.

Referring to FIG. 12, an isometric view of a consumer electronic device cradle is shown holding a small-sized consumer electronic device. In this view, a smaller-sized consumer electronic device 58 such as the Apple Corporation Nano® is shown resting within the sub cavity formed by the second step 26 and resting on the optional support wall 14. For some such smaller-sized consumer electronic devices 58, the smaller-sized consumer electronic device 58 rests on the bottom surface 24 of the cavity 18 (or the cable rests on the bottom surface 24 of the cavity 18). In such a position, the smaller-sized consumer electronic device 58 is raised off the table surface, helping to prevent scratches and other damage. Many smaller-sized consumer electronic devices 58 have controls 54 for selecting songs, etc. and a display for informing the user of various modes of operation 52. Also, many smaller-sized consumer electronic devices 58 have a connector into which a stereo headphone jack 34 with cable 32 is inserted. The cable 30 is connected to the smaller-sized consumer electronic device 58 by a connector similar to the connector 31 as shown in FIG. 12 (not visible in this figure) and the cable 30 is routed through the trough 20. The present invention functions with or without the cable 30 and connector 31 attached. Likewise, the present invention functions with or without an audio cable 32 attached. For some consumer electronic devices such as the smaller-sized consumer electronic device 58, the orientation of the data connector 31 makes it difficult to rest properly in an upright position within the consumer electronic device cradle 10. In such cases, the smaller-sized consumer electronic device 58 rests in an upside-down configuration as shown in FIG. 7, still providing the benefit of keeping the smaller-sized consumer electronic device off of the table surface and thereby protecting it.

Figure 13:
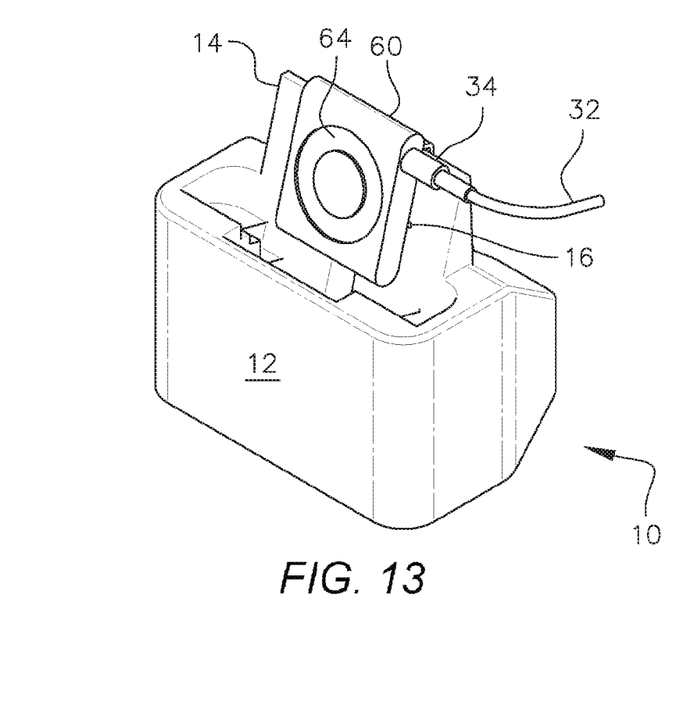
FIG. 13 illustrates an isometric view of a consumer electronic device cradle holding a micro-sized consumer electronic device.

Referring to FIG. 13, an isometric view of a consumer electronic device cradle is shown holding a micro-sized consumer electronic device. Some micro-sized consumer electronic devices 60 are very small and are designed to clip onto a user's clothing. Often, these micro-sized consumer electronic devices 60 such as the Apple Corporation Mini, have no display and only a control 64 for initiating the playing of audio, etc. To support micro-sized consumer electronic devices 60, a pair of front clip indentations 16 and a pair of rear clip indentations 17 are provided. Using these clip indentations 16/17, a clip of the micro-sized consumer electronic device 60 clips onto the support wall and the edges of each side of the micro-sized consumer electronic device's 60 clip is held within the clip indentations 16/17. Without the clip indentations, the micro-sized consumer electronic device's 60 clip would not stay in place, especially if the consumer electronic device cradle 10 is made from a slippery, plastic material. As stated previously, the present invention functions with one set of clip indentations 16/17, two sets of clip indentations 16/17 and without any clip indentations 16/17, depending upon the types and styles of consumer electronic devices supported.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A consumer electronic device cradle for supporting any one of a plurality of consumer electronic devices of differing sizes, the consumer electronic device cradle comprising:
   a base;
   a cavity in the base, the cavity having a first set of dimensions that accepts an end portion of a largest consumer electronic device of the plurality of consumer electronic devices;
   a trough in a back side of the base, the trough adapted to route a cable connected to the one of the plurality consumer electronic devices; and
   whereas the cavity includes at least one step, each of the at least one step defines a sub cavity having a smaller set of dimensions than the first set of dimensions, whereas each sub cavity is sized to hold a different one of the plurality of consumer electronic devices.

2. The consumer electronic device cradle of claim 1, further comprising a support wall, the support wall extends from a surface of the base, the support wall for supporting the one of the plurality of consumer electronic devices.

3. The consumer electronic device cradle of claim 2, wherein the trough extends through the support wall.

4. The consumer electronic system of claim 1, wherein the cable provides power to the one of the plurality of consumer electronic device.

5. The consumer electronic device cradle of claim 2, wherein the cable connects data to the one of the plurality of consumer electronic devices.

6. The consumer electronic device cradle of claim 1, wherein the cable is an audio cable connected to the one of the plurality of consumer electronic devices.

7. A method of supporting one of a plurality of consumer electronic devices, each of the consumer electronic devices having a different size, the method comprising:
   connecting a first consumer electronic device to a first end of the cable, the first consumer electronic device being a largest consumer electronic device of the plurality of consumer electronic devices;
   connecting a second end of the cable connected to a source of power;
   inserting a first end of the first consumer electronic device into a cavity in a base of a cradle, the cavity sized to accept an end portion of the first consumer electronic device and the cavity having at least one step within the cavity, each of the at least one step forming decreasing sized sub cavities towards a bottom of the cavity, whereas the first consumer electronic device rests on a first step of the at least one step;
   passing the cable through a trough in a side of the cavity;
   removing the first consumer electronic device from the cavity;
   connecting a second consumer electronic device of the plurality of consumer electronic devices to the first end of the cable, the second consumer electronic device being smaller than the first consumer electronic device; and
   inserting a first end of the second consumer electronic device into the cavity, the first end of the second consumer electronic device resting within a first sub cavity of the cavities formed by a first step of the at least one step.

8. The method of claim 7, wherein a support wall extends upward from the base and the step of inserting the first end of the first consumer electronic device into the cavity includes resting the first consumer electronic device on the support wall.

9. The method of claim 7, wherein a support wall extends upward from the base and the trough continues through the support wall and the step of inserting the first end of the first consumer electronic device into the cavity includes resting the first consumer electronic device on the support wall and the step of passing the cable through the trough includes passing the cable through the trough in the support wall.

10. The method of claim 7, wherein a support wall extends upwardly from the base and the steps of inserting the first end of the second consumer electronic device into the cavity includes resting the second consumer electronic device on the support wall.

11. The method of claim 7, wherein a support wall extends upwardly from the base and the trough continues through the support wall and the step of inserting the first end of the second consumer electronic device into the cavity includes resting the second consumer electronic device on the support wall and the step of passing the cable through the trough includes passing the cable through the trough in the support wall.

12. A consumer electronic device cradle for supporting any one of a plurality of consumer electronic devices of differing sizes, the consumer electronic device cradle comprising:
   a base;
   a cavity in the base, the cavity for accepting an end portion of a consumer electronic device of the plurality of consumer electronic devices;
   means for routing a data cable that is connected to the end portion of the consumer electronic devices; and
   means for supporting any one the plurality of consumer electronic devices within the base, the means for supporting the any one of the plurality of consumer electronic devices including at least one step that forms sub cavities of decreasing size towards a bottom of the cavity, whereas each sub cavity is of a size to hold a different one of the plurality of consumer electronic devices.

13. The consumer electronic device cradle of claim 12, further comprising means for supporting the any one of the plurality of consumer electronic devices.

14. The consumer electronic device cradle of claim 13, wherein the means for routing a data cable extends through the means for supporting the any one of the plurality of consumer electronic devices.

15. The consumer electronic device cradle of claim 12, wherein the data cable is a Universal Serial Bus cable for connecting to a computer system.

16. The consumer electronic device cradle of claim 12, wherein a first consumer electronic device of the plurality of consumer electronic devices is wider than a second consumer electronic device of the plurality of consumer electronic devices.

17. The consumer electronic device cradle of claim 12, wherein a first consumer electronic device of the plurality of consumer electronic devices is thicker than a second consumer electronic device of the plurality of consumer electronic devices.

\* \* \* \* \*